Patented Apr. 27, 1954

2,676,989

UNITED STATES PATENT OFFICE 2,676,989

METHOD OF ISOMERIZING A POLYENE ALDEHYDE

John D. Cawley, Charles D. Robeson, and Wilbert J. Humphlett, Rochester, N. Y., assignors to Eastman Kodak Company, Rochester, N. Y., a corporation of New Jersey No Drawing. Application September 11, 1951, Serial No. 246,161

19 Claims. (Cl. 260—598)

This invention relates to methods of making α,β-unsaturated 1-cyclohexen-1-ylic polyene aldehydes and is particularly concerned with the preparation of vitamin A aldehyde.

Materials exhibiting high vitamin A biological activity are characterized by a specific basic structure, with the only difference being the nature of the terminal group. Thus the material may be an ester, acid, alcohol, aldehyde, ether or the like, but must have the basic structure

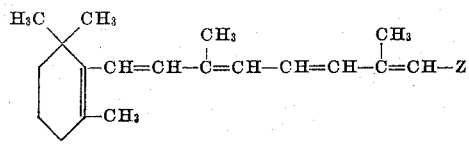

with Z being —CH$_2$OH; —COOH; —CHO; —COOR; —CH$_2$OR; or the like, R being a hydrocarbon radical. Any change in the position of even a single double bond, or saturation of one of the double bonds, or change in the position of a substituent methyl group, or the addition of another substituent group either greatly reduces or entirely destroys the vitamin A biological activity of the material.

For these reasons, the synthesis of vitamin A has been a difficult problem, particularly in view of the fact that the materials of the vitamin A series are unstable and readily decomposed or isomerized. Thus, most proposed syntheses of vitamin A have included either a Reformatsky or a Grignard reaction leading to a hydroxylic compound, usually an ester, as typified by the α,β-dihydro-β-hydroxy vitamin A ester of the formula

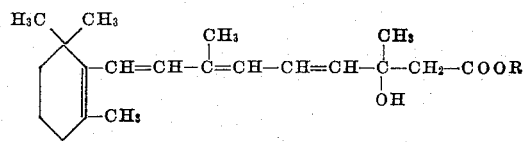

or the diol of the formula

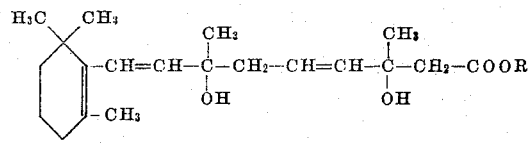

or the hydroxy β-ionylideneacetic acid ester of the formula

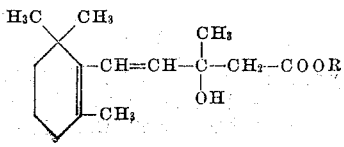

Upon dehydration of such hydroxylic compounds, only a minor proportion dehydrates to give the desired α,β-unsaturated compound; the remainder dehydrating back into the ring to give a 2-cyclohexene-1-ylidenic compound which is isomeric with the desired compound. The conversion of the undesired isomer to the desired compound is costly and time-consuming due to formation of an equilibrium system during the isomerization whereby separation and recycling becomes necessary. In the dehydration of α,β-dihydro-β-hydroxy vitamin A ester, therefore, a substantial part of the product has the formula

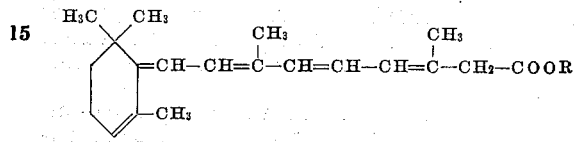

and the dehydration product of the diol comprises two possible isomers besides the desired vitamin A ester, namely,

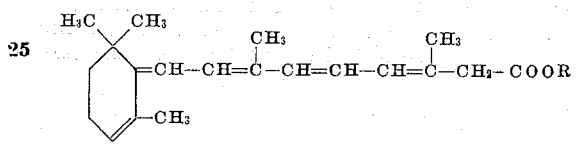

and

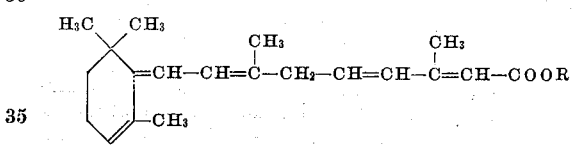

while the hydroxy β-ionylidene acetic acid ester dehydrates to give the isomer

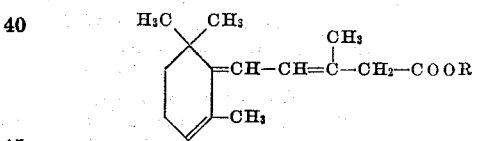

The shifting of the unsaturation and interposition of a —CH$_2$— group in the chain gives compounds largely devoid of vitamin A biological activity and difficult to convert to the desired compounds.

It is accordingly an object of this invention to provide an improved method of making α,β-unsaturated, completely conjugated 1-cyclohexen-1-ylic polyene compounds.

Another object of the invention is to provide a new method of converting undesired isomers of the compounds of the vitamin A series to the desired compounds.

Another object of the invention is to facilitate vitamin A syntheses which include a Grignard, Reformatsky or similar reaction yielding a hydroxy compound which ordinarily dehydrates in an undesirable manner.

Another object of the invention is to provide a new method of converting undesired isomers of the vitamin A series to the desired α,β-unsaturated conjugated compounds in high yield.

Another object of the invention is to provide a useful method for obtaining α,β-unsaturated 1-cyclohexen-1-ylic polyene aldehydes from 2-cyclohexen-1-ylidenic isomers thereof.

Another object of the invention is to provide a method of making vitamin A aldehyde having the vitamin A structure from material having the chemical composition of vitamin A aldehyde but a different structural configuration.

Another object of the invention is to convert vitamin A-inactive material to vitamin A aldehyde.

Another object of the invention is to increase the yield of vitamin A in syntheses involving dehydration of a hydroxyl compound by providing a new and improved method of altering the structural configuration resulting from such dehydration.

Other objects will be apparent from the description and claims which follow.

These and other objects of the invention are successfully attained by means of the present invention as described more fully hereinafter with reference to certain preferred embodiments thereof.

In accordance with this invention, an α,β-unsaturated, completely conjugated 1-cyclohexen-1-ylic polyene is obtained by treating the product obtained by dehydrating and hydrolyzing a hydroxy polyene acetal and preferably a hydroxylic vitamin A dialkyl acetal, as described more fully hereinafter, and postulated as being a 2-cyclohexen-1-ylidenic aldehyde of the formula

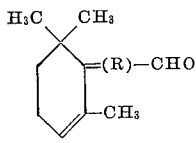

wherein R is an unsaturated aliphatic hydrocarbon radical containing at least five carbon atoms and including a single chain —CH$_2$— group, with a basic catalyst, and thereby converting the 2-cyclohexen-1-ylidenic aldehyde to an α,β-unsaturated, completely conjugated 1-cyclohexen-1-ylic polyene aldehyde containing no —CH$_2$— group in the aliphatic hydrocarbon radical.

We have discovered that, unlike the acids, esters and ethers of the vitamin A series, the aldehydes readily rearrange to the desired α,β-unsaturated completely conjugated structure when treated with a catalytic amount of material having a basic character and that such rearrangement takes place in nearly quantitative yield with no equilibrium mixture being formed.

Thus, by means of this invention, vitamin A syntheses can be effected through steps involving dehydration of hydroxyl compounds wherein isomerization of the unsaturated linkages normally occurs, provided the terminal group is an aldehyde group or readily convertible to an aldehyde group whereby the compounds are readily rearranged to the desired structural configuration. The invention is applicable for preparation of β-ionylideneacetaldehyde and is particularly useful for preparing vitamin A aldehyde which is readily reduced to vitamin A alcohol.

The 2-cyclohexen-1-ylidenic compounds treated in accordance with this invention and having the formula

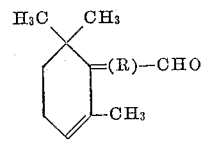

have from five to ten carbon atoms in the aliphatic hydrocarbon radical R. The aliphatic chain contains but a single —CH$_2$— group, and this group is in an even-numbered position from the ring. In the case of the ten-membered radical, the radical includes a substituent methyl group on the carbon atoms in the three and seven positions from the ring. In the remaining shorter chain compounds, there is a substituent methyl group on the third carbon atom from the ring.

The process embodying this invention is preferably carried out with the 2-cyclohexen-1-ylidenic aldehyde dissolved in an organic solvent such as benzene, toluene, petroleum ether, ethyl ether or the like. The conversion to the desired 1-cyclohexen-1-ylic aldehyde is desirably promoted by basic catalysis. Any of the well-known materials exhibiting a basic character can be employed including both organic and inorganic materails. Suitable materials include the inorganic hydroxides, salts of strong bases and weak acids, organic bases such as amines, and the like. The amount of basic material is not critical, trace portions being effective to catalyze the conversion embodying the invention.

Typical basic materials which are suitable for use as catalysts include sodium hydroxide, potassium hydroxide, potassium acetate, sodium acetate, pyridine, lutidine, picolines, aniline, morpholine, sodium aluminum silicate, sodium ethylate, aluminum alkoxides, ammonium hydroxide, piperidine, alkaline soaps and the like.

The 2-cyclohexen-1-ylidenic aldehydes which are treated in accordance with this invention can be prepared in any suitable manner. For example, the aldehyde, 9-(2,6,6-trimethyl-2-cyclohexen-1-ylidene)-3,7-dimethyl-2,4,6-nonatriene-1-al can be prepared by condensing β-ionone with a propinyl halide to form a propinyl carbinol, condensation of this carbinol with a dialkyl acetal of β-ketobutyraldehyde followed by hydrogenation of the acetylenic linkage to form a vitamin A diacetal-2,3,6,7-tetrahydro-3,7-diol, and dehydration of this diol with phosphorous oxychloride and pyridine to a 2-cyclohexen-1-ylidenic enol ether corresponding to the desired 2-cyclohexen-1-ylidenic aldehyde. The enol ether is then hydrolyzed with mineral acid to the 2-cyclohexen-1-ylidenic aldehyde having the structural formula

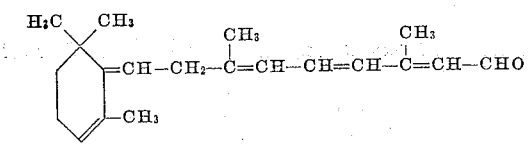

The method of synthesizing 2-cyclohexen-1-ylidenic aldehydes in this manner is described in greater detail in the copending application of Humphlett and Burness, Serial No. 246,165, filed September 11, 1951.

In like manner, the 2-cyclohexen-1-ylidenic aldehyde, 9 - (2,6,6 - trimethyl-2-cyclohexen-1-ylidene) - 3,7-dimethyl-3,5,7-nonatriene-1-al can be prepared by condensing β-ionone with propinyl halide to form the propinyl carbinol, dehydrating the carbinol to the corresponding 2-cyclohexen-1-ylidenic compound, condensing this compound with a dialkyl acetal of β-ketobutyraldehyde to form a 3-hydroxy 2-cyclohexen-1-ylidenic acetal, hydrogenating the acetylenic linkage to an olefinic linkage and subjecting the resulting compound to controlled dehydration followed by hydrolysis to give the 2-cyclohexen-1-ylidenic aldehyde of the formula

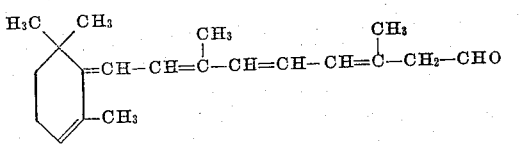

The aldehyde having the —CH$_2$— group in the 4 position from the ring can be prepared by substantially the same process as employed for the aldehyde having such group in the 8 position from the ring with the exception that the dehydration of the 7-hydroxy compound is effected prior to partial hydrogenation of the acetylenic linkage. The aldehyde having the —CH$_2$— group in the 6 position from the ring can be prepared by first condensing the propargyl halide with the dialkyl acetal of β-ketobutyraldehyde and dehydrating the resulting carbinol, condensing the α,β-unsaturated dehydration product with β-ionone, hydrogenating the acetylenic linkage to an olefinic linkage, dehydrating the resulting 7-hydroxy acetal to the corresponding enol ether and hydrolyzing the enol ether to the 2-cyclohexen-1-ylidenic aldehyde. The shorter chain 2-cyclohexen-1-ylidenic aldehydes can be prepared by like processes.

In accordance with this invention, the 2-cyclohexen-1-ylidenic aldehydes which are largely devoid of vitamin A activity are then rearranged by basic catalysis to vitamin A aldehyde which is readily reduced to vitamin A alcohol by well-known reduction processes for converting aldehydes to alcohols. Various mechanisms may be advanced to explain the conversion of a hydroxylic vitamin A dialkyl acetal to vitamin A aldehyde by dehydration, hydrolysis and treatment with a basic catalyst as described herein, without changing the operative steps set out.

The invention is illustrated by the following examples of preferred embodiments. The ultraviolet absorption data (E values) in the following examples were determined in ethanol in accordance with usual practice.

*Example 1*

A 0.58 g. portion of 9-(2,6,6-trimethyl-2-cyclohexene - 1-ylidene) -3,7-dimethyl-2,4,6-nonatriene-1-al having $$E_{1\,cm.}^{1\%}\,(328\ m\mu)=900$$

was dissolved in 100 cc. of petroleum ether and the resulting solution was passed through a column of synthetic sodium aluminum silicate. The column was washed with additional petroleum ether, and 0.50 g. of vitamin A aldehyde having $$E_{1\,cm.}^{1\%}\,(377\ m\mu)=1115$$

was recovered, the rearrangement on passage through the alkaline adsorbent having been effected in a yield of 67%.

*Example 2*

A 1.0 g. portion of the aldehyde, 9-(2,6,6-trimethyl - 2-cyclohexene-1-ylidene) -3,7-dimethyl-2,4,6-nonatriene-1-al having $$E_{1\,cm.}^{1\%}\,(328\ m\mu)=794$$

was dissolved in 5 cc. of benzene. To a 1 ml. aliquot was added two drops of pyridine and the mixture was allowed to stand overnight at room temperature. The pyridine catalyzed rearrangement to vitamin A aldehyde having λ maximum=370 mμ. A similar sample treated with the non-basic pyridine hydrochloride remained unchanged at λ maximum=328 mμ. A sample treated with iodine solution, a common isomerization catalyst, similarly remained unchanged.

*Example 3*

Another aliquot, as in Example 2, was treated with a pinch of synthetic sodium aluminum silicate and allowed to stand overnight at room temperature. It was found that the aldehyde having λ max.=328 mμ was converted to vitamin A aldehyde having λ max.=370 mμ.

*Example 4*

An 0.8 g. sample of 2-cyclohexen-1-ylidenic aldehyde having $$E_{1\,cm.}^{1\%}\,(330\ m\mu)=705$$

was dissolved in 6 cc. of ethanol. To the resulting solution was added 9 drops of 0.5 N. potassium hydroxide solution and the mixture was allowed to stand at room temperature for three hours. The product was washed with water and dried over anhydrous sodium sulfate to give vitamin A aldehyde having $$E_{1\,cm.}^{1\%}\,(370\ m\mu)=527$$

*Example 5*

An 0.9 g. sample of 2-cyclohexen-1-ylidenic aldehyde having $$E_{1\,cm.}^{1\%}\,(328\ m\mu)=630$$

was dissolved in 10 ml. of ether and treated with a mixture of acetic acid and potassium acetate which is a system of basic character. After standing overnight at room temperature the product was vitamin A aldehyde having $$E_{1\,cm.}^{1\%}\,(370\ m\mu)=567$$

The rearrangement of other 2-cyclohexen-1-ylidenic aldehydes is catalyzed by other well-known materials of basic character in similar fashion.

The invention thus provides a highly effective method of obviating the troublesome isomerization of compounds of the vitamin A series during dehydration following a Grignard or Reformatsky reaction. The 2-cyclohexen-1-ylidenic aldehydes, unlike other 2-cyclohexen-1-ylidenic compounds such as esters or the like, readily rearrange in high yield to the desired completely conjugated, α,β-unsaturated 1-cyclohexen-1-ylic aldehydes when treated with a basic material in accordance with this invention.

Although the invention has been described in considerable detail with reference to certain preferred embodiments thereof, it will be under-

We claim:

1. The method of making an α,β-unsaturated, completely conjugated 1-cyclohexen-1-ylic polyene aldehyde which comprises treating a solution, in an organic solvent, of a 2-cyclohexen-1-ylidenic aldehyde of the formula

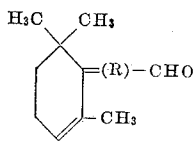

wherein R is an unsaturated aliphatic hydrocarbon radical containing at least five carbon atoms and including a single chain —CH₂— group, said —CH₂— group being in an even-numbered position from the ring, with a basic catalyst, and thereby converting said 2-cyclohexen-1-ylidenic aldehyde to an α,β-unsaturated completely conjugated 1-cyclohexen-1-ylic aldehyde containing no —CH₂— group in the aliphatic hydrocarbon radical.

2. The method of making an α,β-unsaturated, completely conjugated 1-cyclohexen-1-ylic polyene aldehyde which comprises treating a solution, in an organic solvent, of a 2-cyclohexen-1-ylidenic aldehyde of the formula

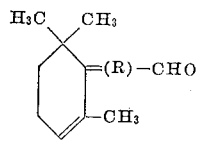

wherein R is an unsaturated aliphatic hydrocarbon radical containing at least five and not more than ten carbon atoms and including a single chain —CH₂— group, said —CH₂— group being in an even-numbered position from the ring, with a basic catalyst, and thereby converting said 2-cyclohexen-1-ylidenic aldehyde to an α,β-unsaturated completely conjugated 1-cyclohexen-1-ylic aldehyde containing no —CH₂— group in the aliphatic hydrocarbon radical.

3. The method of making an α,β-unsaturated, completely conjugated 1-cyclohexen-1-ylic polyene aldehyde which comprises treating a solution, in an organic solvent, of a 2-cyclohexen-1-ylidenic aldehyde of the formula

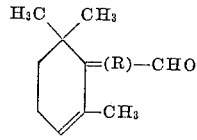

wherein R is an unsaturated aliphatic hydrocarbon radical containing five carbon atoms including a substituent methyl group on the third carbon atom from the ring and including a single chain —CH₂— group, said —CH₂— group being in an even-numbered position from the ring, with a basic catalyst, and thereby converting said 2-cyclohexen-1-ylidenic aldehyde to an α,β-unsaturated completely conjugated 1-cyclohexen-1-ylic aldehyde containing no —CH₂— group in the aliphatic hydrocarbon radical.

4. The method of making an α,β-unsaturated, completely conjugated 1-cyclohexen-1-ylic polyene aldehyde which comprises treating a solution, in an organic solvent, of a 2-cyclohexen-1-ylidenic aldehyde of the formula

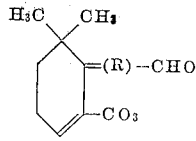

wherein R is an unsaturated aliphatic hydrocarbon radical containing ten carbon atoms including a substituent methyl group on the third and the seventh carbon atoms from the ring and including a single chain —CH₂— group, said —CH₂— group being in an even-numbered position from the ring, with a basic catalyst, and thereby converting said 2-cyclohexen-1-ylidenic aldehyde to an α,β-unsaturated completely conjugated 1-cyclohexen-1-ylic aldehyde containing no —CH₂— group in the aliphatic hydrocarbon radical.

5. The method of making an α,β-unsaturated, completely conjugated polyene aldehyde which comprises treating a solution, in an organic solvent, of a 2-cyclohexen-1-ylidenic aldehyde of the formula

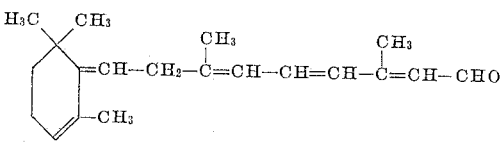

with a basic catalyst and thereby converting said 2-cyclohexen-1-ylidenic aldehyde to vitamin A aldehyde of the formula

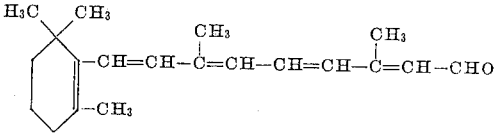

6. The method of making an α,β-unsaturated, completely conjugated polyene aldehyde which comprises treating a solution, in an organic solvent of a 2-cyclohexen-1-ylidenic aldehyde of the formula

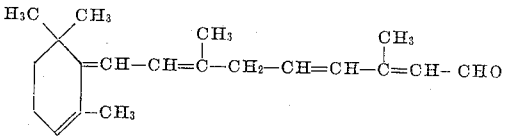

with a basic catalyst and thereby converting said 2-cyclohexen-1-ylidenic aldehyde to vitamin A aldehyde of the formula

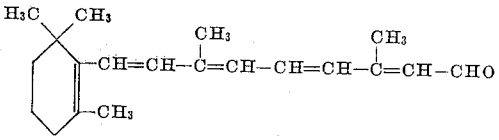

7. The method of making an α,β-unsaturated, completely conjugated polyene aldehyde which comprises treating a solution, in an organic solvent, of a 2-cyclohexen-1-ylidenic aldehyde of the formula

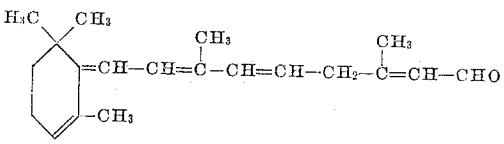

with a basic catalyst and thereby converting said 2-cyclohexen-1-ylidenic aldehyde to vitamin A aldehyde of the formula

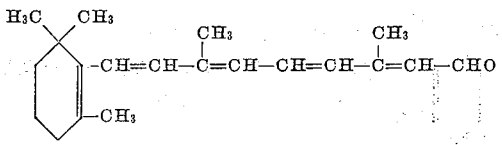

8. The method of making vitamin A aldehyde which comprises treating a solution, in an organic solvent, of a 2-cyclohexen-1-ylidenic aldehyde of the formula

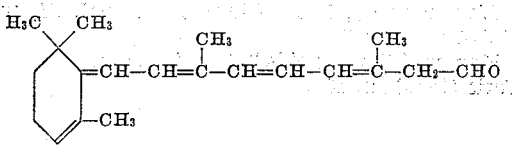

with a basic catalyst and thereby converting said 2-cyclohexen-1-ylidenic aldehyde to vitamin A aldehyde of the formula

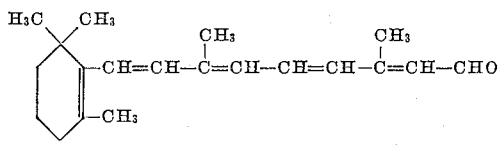

9. The method of making vitamin A aldehyde which comprises treating an aldehyde of the formula

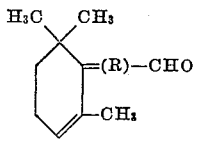

wherein R is an unsaturated aliphatic hydrocarbon radical containing ten carbon atoms including a substituent methyl group on the third and seventh carbon atoms from the ring and including a single chain —CH₂— group, said —CH₂— group being in an even-numbered position from the ring, with an inorganic base and thereby converting said aldehyde to vitamin A aldehyde.

10. The method of making vitamin A aldehyde which comprises treating an aldehyde of the formula

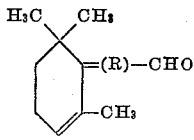

wherein R is an unsaturated aliphatic hydrocarbon radical containing 10 carbon atoms including a substituent methyl group on the third and seventh carbon atoms from the ring and including a single chain —CH₂— group, said —CH₂— group being in an even-numbered position from the ring, with an organic base and thereby converting said aldehyde to vitamin A aldehyde.

11. The method of making vitamin A aldehyde which comprises filtering through a body of alkaline adsorbent a solution, in an organic solvent, of an aldehyde of the formula

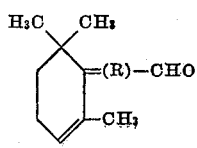

wherein R is an unsaturated aliphatic hydrocarbon radical containing 10 carbon atoms including a substituent methyl group on each of the carbon atoms in the third and seventh positions from the ring and including a single —CH₂— group, said —CH₂— group being in an even-numbered position from the ring, and thereby converting said aldehyde to vitamin A aldehyde.

12. The method of making vitamin A aldehyde which comprises filtering through a body of sodium aluminum silicate adsorbent a solution, in an organic solvent, of an aldehyde of the formula

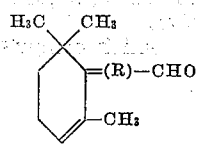

wherein R is an unsaturated aliphatic hydrocarbon radical containing 10 carbon atoms including a substituent methyl group on each of the carbon atoms in the third and seventh positions from the ring and including a single —CH₂— group, said —CH₂— group being in an even-numbered position from the ring, and thereby converting said aldehyde to vitamin A aldehyde.

13. The method of making vitamin A aldehyde which comprises treating an aldehyde of the formula

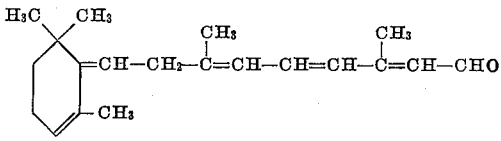

with an inorganic base and thereby converting said aldehyde to vitamin A aldehyde.

14. The method of making vitamin A aldehyde which comprises treating an aldehyde of the formula

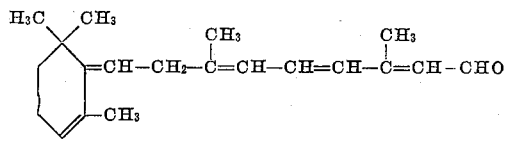

with an organic base and thereby converting said aldehyde to vitamin A aldehyde.

15. The method of making vitamin A aldehyde which comprises treating with a basic catalyst the aldehydic product, isomeric to vitamin A aldehyde, having λ max.=328 mμ and being the product obtained by dehydration and hydrolysis of a hydroxylic vitamin A dialkyl acetal.

16. The method of making vitamin A aldehyde which comprises treating with a basic catalyst the aldehydic product, isomeric to vitamin A aldehyde, having λ max.=328 mμ and being the product obtained by dehydration and hydrolysis of a vitamin A diol dialkyl acetal of the formula

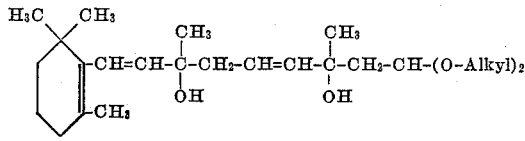

17. The method of making vitamin A aldehyde which comprises treating, with an alkaline adsorbent, an aldehyde of the formula

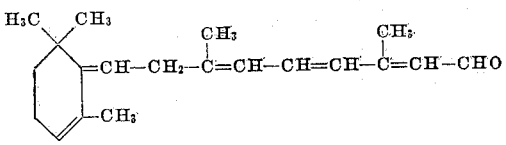

and thereby converting said aldehyde to vitamin A aldehyde.

18. The method which comprises dehydrating and hydrolyzing a hydroxylic vitamin A dialkyl acetal and treating the product thereby obtained with a basic catalyst.

19. The method which comprises dehydrating and hydrolyzing a vitamin A diol dialkyl acetal of the formula

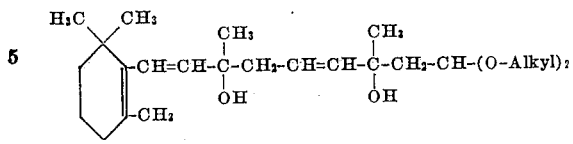

and treating the product thereby obtained with a basic catalyst.

OTHER REFERENCES

Karrer et al., Helv. Chim. Acta., vol. 31, pp. 1055–1062 (1948).

Karrer, "Carotenoids," Elsevier Pub. Co., New York (1950), p. 183.